United States Patent [19]
Hibino et al.

[11] Patent Number: 5,598,394
[45] Date of Patent: Jan. 28, 1997

[54] OPTICAL PICK-UP

[75] Inventors: Katsutoshi Hibino; Yasuko Teragaki, both of Gifu, Japan

[73] Assignee: Sanyo Electric Co., Ltd., Osaka, Japan

[21] Appl. No.: 442,162

[22] Filed: May 16, 1995

[30] Foreign Application Priority Data

May 19, 1994 [JP] Japan .................... 6-131216

[51] Int. Cl.$^6$ .................................. G11B 7/00
[52] U.S. Cl. ................ 369/112; 369/109; 369/44.12
[58] Field of Search ................... 369/112, 109, 369/103, 110, 116, 120, 121, 44.12, 106

[56] References Cited

U.S. PATENT DOCUMENTS

| | | | |
|---|---|---|---|
| 4,823,331 | 4/1989 | Yoshitoshi et al. | 369/112 |
| 5,005,162 | 4/1991 | Mitsumori et al. | 369/44.12 |
| 5,146,449 | 9/1992 | Shimozawa | 369/106 |
| 5,164,930 | 11/1992 | Sugiura | 369/44.12 |
| 5,283,771 | 2/1994 | Kadowaki et al. | 369/103 |
| 5,396,061 | 3/1995 | Taniguchi et al. | 369/112 |
| 5,410,468 | 4/1995 | Horinouchi | 369/103 |

*Primary Examiner*—Loha Ben
*Attorney, Agent, or Firm*—Armstrong, Westerman, Hattori, McLeland & Naughton

[57] ABSTRACT

An optical pick-up comprising a laser source (laser diode), a plurality of optical elements, beam splitter, focusing means (microlens) and detecting means (photo diode) is disclosed. The plurality of optical elements focuses a laser beam which is emitted from the laser diode onto a magneto-optic disc, and focuses a laser beam which is reflected from the magneto-optic disc onto a photo detector. The beam splitter splits the laser beam, which is emitted from the laser diode, by reflecting a part of the laser beam at a first surface and by refracting the other part of the laser beam at the first surface. The reflected part is entered into the optical elements and the refracted part is passed through the beam splitter and then emerged from a second surface. The microlens is integrally formed on the second surface of the beam splitter by the ion exchanging method. And the microlens focuses the beam which is emerged from the second surface. The photo diode detects the beam which is focused by the microlens. The beam splitter, the beam splitter, the microlens and the photo diode are mounted on a common substrate.

7 Claims, 5 Drawing Sheets

OPTICAL PICK-UP

BACKGROUND OF THE INVENTION

1. Field of the Invention

The present invention generally relates to an optical pick-up. More particularly, the present invention relates to an optical pick-up used in a MO (magneto-optic) drive or MO player.

2. Description of the Related Art

An optical pick-up comprising a laser diode, a variety of optical elements, an object lens, a photo detector and so on is incorporated in a MO-drive. The MO drive reads the information from a magneto-optic disc by using a laser, and writes the information to the magneto-optic disc both by using a laser and by applying a magnetic field.

In the optical pick-up, the optical power of a laser light emitted from the laser diode is monitored to control the intensity or the quantity of the laser light to be constant. FIGS. 3(a) and 3(b) illustrate conventional mechanisms for monitoring the intensity or the quantity of laser lights emitted from laser diodes 31, 41, respectively.

For example, in FIG. 3(a), a main laser beam for reading information from a magneto-optic disc or writing information to a magneto-optic disc is emitted in a direction A from a laser diode 31, while a sub laser beam for monitoring the laser power is emitted in a direction B from the laser diode 31. The direction B is opposite to the direction A. The sub laser beam is detected by a photo diode 32. The output signal from the photo diode 32 is inputted to an auto power control (APC) circuit. The APC circuit controls the current applied to the laser diode 31 based on the signal from the photo diode 32 to output a laser having the constant intensity and the constant quantity.

In FIG. 3(b), main laser beams for reading information from a magneto-optic disc or writing information to a magneto-optic disc is emitted in a direction C from laser diodes 41a, 41b and 41c respectively which are mounted on a three-beam laser diode array 41, while sub laser beams are emitted in the direction opposite to the direction of the main beams and detected by photo diodes 42a, 42b and 42c respectively. The output signals from the photo diodes 42a, 42b and 42c are inputted to an auto power control (APC) circuit. The APC circuit controls the each current applied to the each laser diode 41a, 41b and 41c based on the signals from the photo diodes 42a, 42b and 42c respectively to output lasers having the constant intensity and the constant quantity. The reference numeral 43 is a guide for guiding the sub beams emitted from the laser diodes 41a, 41b and 41c respectively to the respective photo diodes 42a, 42b and 42c.

SUMMARY OF THE INVENTION

In an optical pick-up for a magneto-optic disc, an optical system is so constructed that a part of a laser beam emitted from a laser diode and then reflected from the magneto-optic disc returns to the laser diode. When the part of the laser beam reflected from the magneto-optic disc mirrored surface returns to the laser diode, the sub beam emitted from the laser diode in the opposite direction of the main beam is rendered unstable. When the output of the sub beam for monitoring is rendered unstable, the intensity or the quantity of the laser emitted from the laser diode can not precisely be detected.

Accordingly, it is an object of the present invention to detect the laser power for monitoring precisely.

In order to achieve the above object, optical elements for monitoring such as the photo diode should be provided on the main beam emission side to monitor the main beam. However, the provision of the optical elements for monitoring on the main beam emission side would cause a problem that the construction thereof would be rendered complicate. Particularly, in a laser diode array having a plurality of laser diodes, a guide should be provided to guide each beam emitted from the each laser diode to each photo diode corresponding thereto, and this guide is too complicated in construction to easily be manufactured.

It is a further object of the present invention to provide optical elements for monitoring such as a photo diode of simple construction on the main beam emission side.

An optical pick-up according to the present invention is characterized by comprising on a common substrate a light-emitting element for emitting a laser beam, a light-splitting element for splitting the laser beam, a light-converging element for converging one of the splitted laser beam, a light-detecting element for detecting the laser beam focused by the light-converging element.

The light-emitting element may be a laser diode or the like. The light-splitting element may be a beam splitter, a half mirror or the like. The light-converging element may be a microlens formed to the transmitted light emerging surface of the beam splitter, for example, but a lens separated from the beam splitter may also be used instead. The light-detecting element may be a photo diode, and may be provided thereon with an antireflective layer.

The optical pick-up according to the present invention has on a semiconductor substrate a laser diode and a beam splitter. The beam splitter reflects a part of the laser beam emitted from the laser diode in a specified direction and concurrently transmits the other part of the laser beam. Behind the transmitted light emission surface of the beam splitter is provided a photo diode to detect the intensity or the quantity of the laser light emitted from the laser diode. On the other hand, a microlens is integrally provided on the transmitted laser beam emission surface of the beam splitter to focus the laser beam transmitted from the beam splitter onto the photo diode.

The microlens may integrally be provided on the transmitted laser beam emission surface of the beam splitter by the ion exchanging method, for example. Specifically, the microlens may be constructed by providing a mask on the flat glass substrate, forming a circular opening by using the photolithographic technique, and realizing a refractive index distribution in the glass substrate by means of the ion exchanging treatment. Here, the microlens treated with surface polishing after ion exchanging is called a "distributed refractive index flat microlens," and the unpolished microlens with the microscopic swelling of convex parts left for utilization as they are is called a "swelled flat microlens." For a laser diode array having a plurality of laser diodes, a microlens array is used instead of the microlens.

BRIEF DESCRIPTION OF THE DRAWINGS

FIG. 1 illustrates an important part of an optical pick-up according to an embodiment of the present invention, wherein

FIG. 3 illustrates a conventional laser beam monitoring mechanism, wherein

DETAILED DESCRIPTION OF THE PREFERRED EMBODIMENT

Figure 1A:
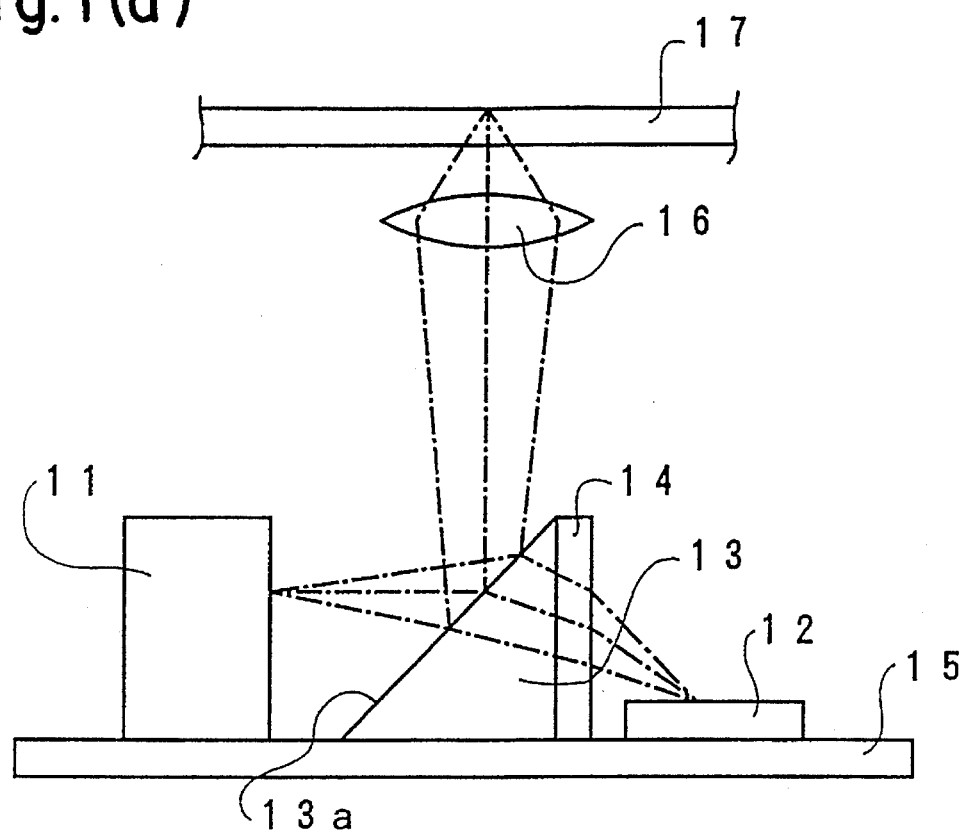
FIG. 1(a) is a front view thereof and FIG. 1(b) is a perspective view thereof.
Figure 1B:
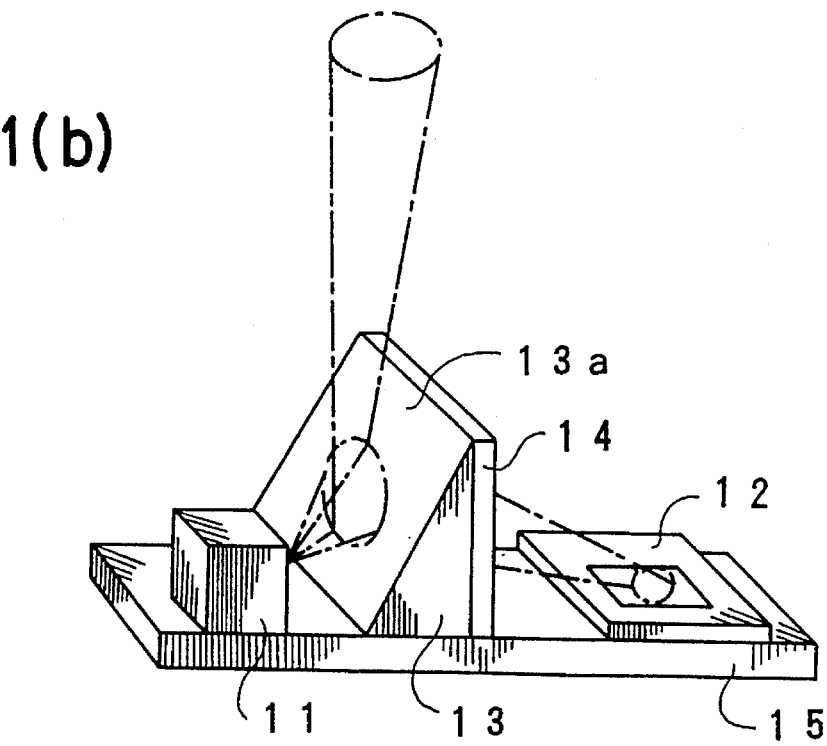

As illustrated in FIG. 1, a laser diode 11, a beam splitter 13 and a photo diode 12 are provided on a common semiconductor substrate 15. The beam splitter 13 is so located as to receive a laser beam emitted from the laser diode 11. Behind the beam splitter 13 is located the photo diode 12.

The beam splitter 13 is an element which reflects thereby a part of a laser beam emitted from the laser diode 11 and concurrently transmits therethrough the other part of the laser beam. For this purpose, the beam splitter 13 includes a slanted surface 13a to reflect thereby a specified rate of the laser beam and concurrently transmit therethrough a specified rate of the laser beam. On the transmitted light emission surface of the beam splitter 13 (=a surface from which the laser beam transmitted through the slanted surface 13 emerges) is integrally provided a microlens 14. The microlens 14 is an element which focuses the laser beam transmitted through the beam splitter 13 onto the photo diode 12, and can be manufactured by means of the ion exchanging method or the like. The photo diode 12 is coated thereover with an antireflective layer. The photo diode 12 produces signals responsive to the intensity or the quantity of the focused laser beam.

Figure 5:
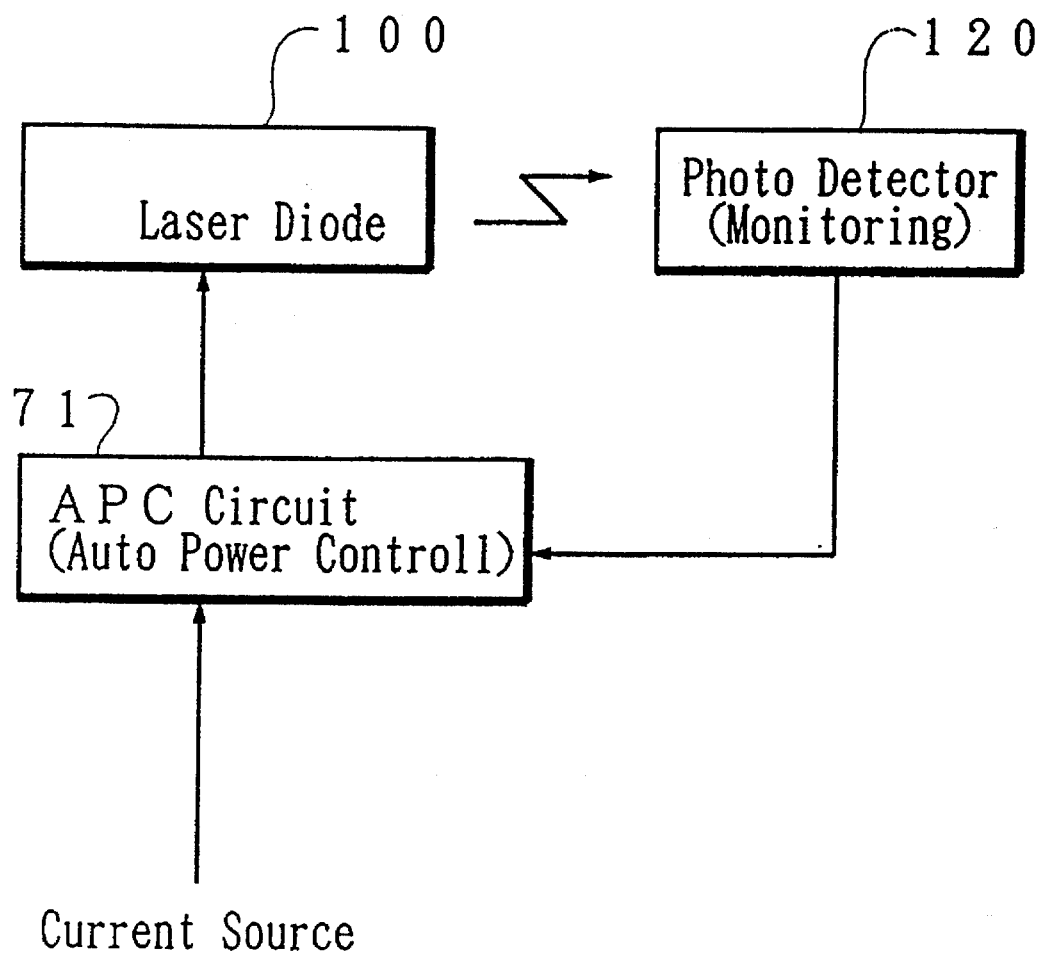
FIG. 5 is a block diagram of controlling a current applied to the laser diode incorporated to the optical pick-up of the embodiments.

The output signal from the photo diode 12 (the photo diode 120 in FIG. 5) is inputted to an auto power control (APC) circuit 71 (shown in FIG. 5) and used for controlling the power of the laser emitted from the laser diode 11 to be constant. In other words, so that the power of the laser beam detected by the photo diode 12 becomes a preset value, an applying current to the laser diode 11 is regulated by an output signal inputted from the photo diode 12.

The laser beam reflected from the slanted surface 13a of the beam splitter 13 is focused by an objective lens 16 onto a magneto-optic disc 17, whereby magnetization information in the magneto-optic disc 17 is read or magnetization information is written in the magneto-optic disc 17.

Figure 4:
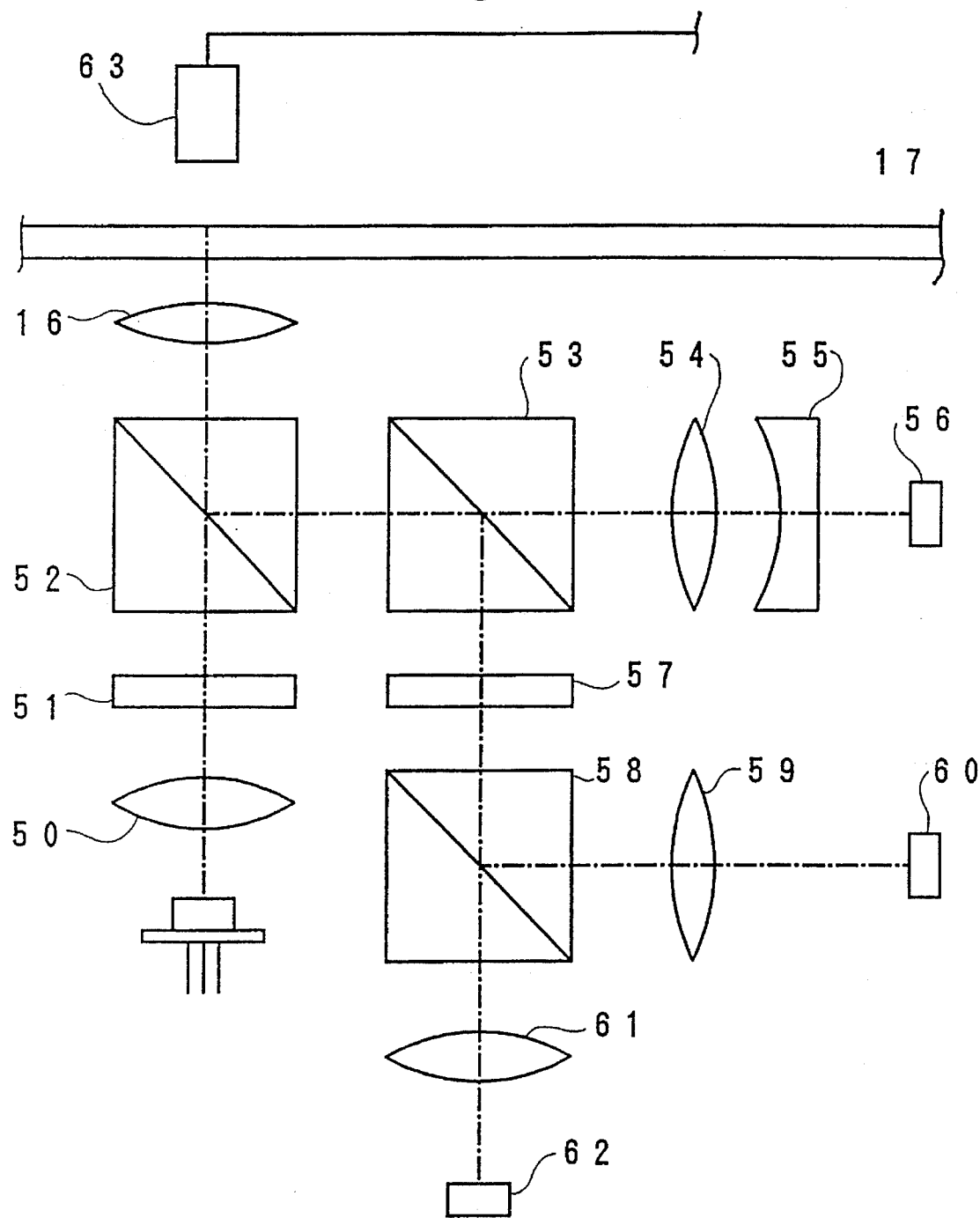
FIG. 4 is a standard view showing a construction of an optical system of the optical pick-up according to the embodiments of the present invention.

To be specific, the laser beam emitted from the laser diode 11 and reflected from the slanted surface 13a of the beam splitter 13 is converged into a parallel beam by the collimation lens 50, as illustrated in FIG. 4, and passes through the diffraction grating 51, generating two secondary beams (not shown) called side beams which are used by a tracking servo circuit to maintain correct tracking of the disc. The beam enters a half mirror 52 and passes. The beam is focused by an object lens 16 onto the magneto-optic disc.

A magnetic field is applied to the magneto-optic disc 17 by a magnetic coil 63. Accordingly, when the laser beam with writing power is striked to the magneto-optic disc 17 as described above, the information is written in the magneto-optic disc 17 or deleted therefrom. On the other hand, when the laser beam with reading power is striked to the magneto-optic disc 17 as described above, the magnetization information in the magneto-optic disc 17 is read.

The laser beam reflected from the magneto-optic disc 17 converged into a parallel beam by object lens 16 and reflected from the half mirror 52 toward a half mirror 53 which is positioned in the direction at right angles to the incident angle to the half mirror 52. A part of the laser beam entered the half mirror 53 transmits through the half mirror 53 and is focused onto a photodiode 56 through a lens 54 and a cylindrical lens 55. On the other hand, the other part of the laser beam entered the half mirror 53 is reflected in the direction at right angles to the incidental direction, transmits through a half-wave plate 57 and enters the polarizing beam splitter 58. A part of the laser beam entered the polarizing beam splitter 58 is reflected by a slanted surface thereof and is focused by a lens 59 onto a first photo diode 60, and the other part of the laser entered the polarizing beam splitter 58 is transmitted therethrough and focused by a lens 61 onto a second photo diode 62. By this arrangement, a part where the optical polarizing angle is rotating is detected. Difference in the output signals from the first and second photo diodes 60 and 62 is obtained, and the magnetization information in the above magneto-optic disc 17 is read.

The size of each element of the above first embodiment will now be examined.

When the distance between the laser diode 11 and the beam splitter 13 is set to 2 [mm] and the expansion angle (full angle at half maximum) of the laser beam emitted from the laser diode 11 is set to 30°, for example, the diameter of the laser beam entering the beam splitter 13 is approximately 1.1 [mm], and the size of the beam splitter 13 is at most approximately 2 [mm]×2 [mm]×2 [mm]. When the thickness of the microlens 14 is set to 0.5 [mm] and the focal length of the microlens 14 is set to 3 [mm], the photo diode 12 can be disposed in a position approximately 0.5 [mm] to 2.5 [mm] behind the beam splitter 13. As a result, these elements can be housed within a single package (e.g., 9 mmφ).

When the distance between the laser diode 11 and the beam splitter 13 is shortened to 1.5 [mm] or the expansion angle (full angle at half maximum) of the laser beam emitted from the laser diode 11 is narrowed to 20°, the size of the beam splitter is reduced to approximately 1.5 [mm]×1.5 [mm]×1.5 [mm], and these elements can be housed within a smaller single package.

Figure 2:
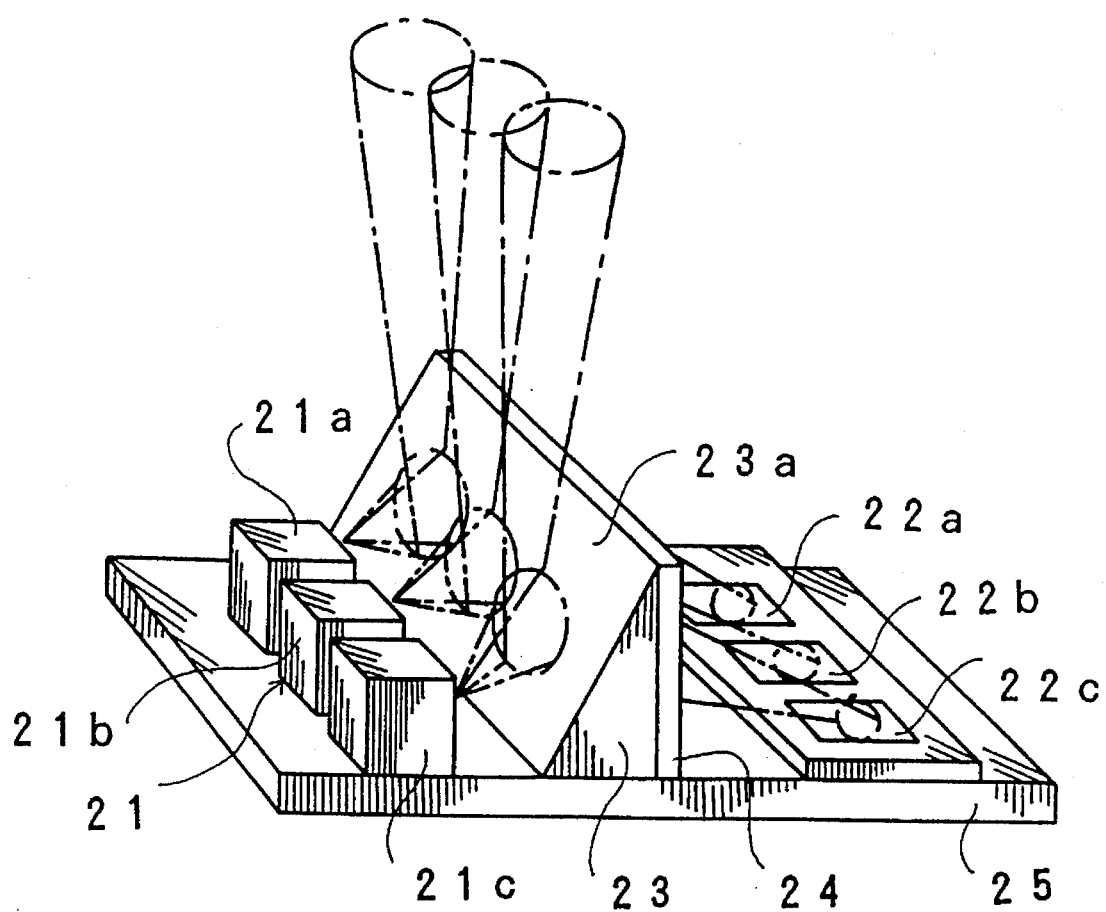
FIG. 2 is a perspective view of an important part of an optical pick-up according to another embodiment of the present invention.
Figure 3A:
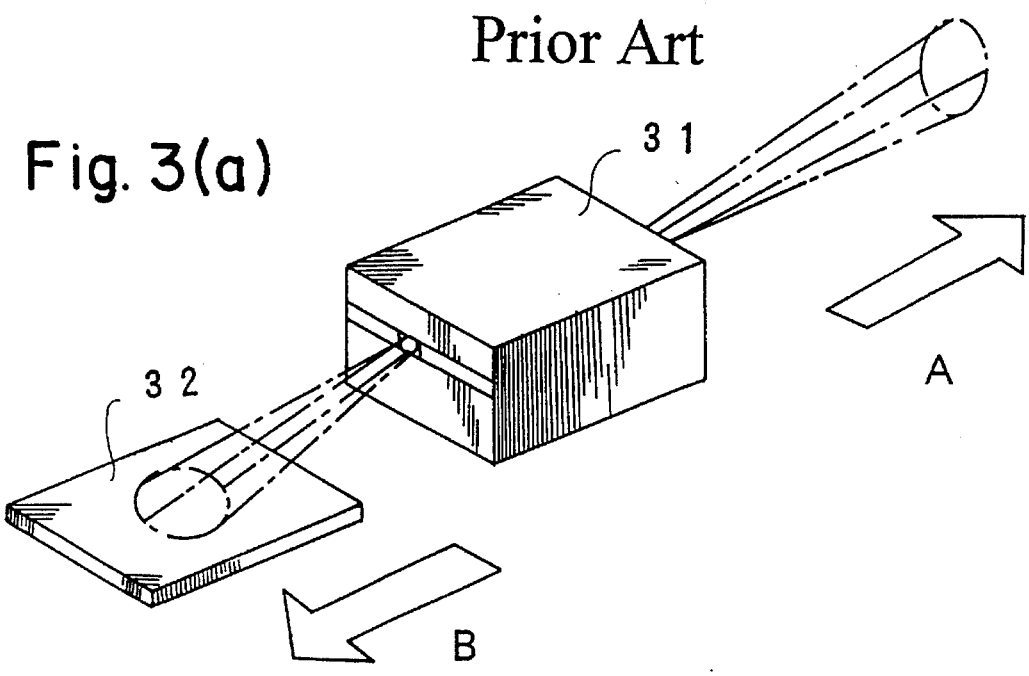
FIG. 3(a) is a perspective view thereof with one laser beam and FIG. 3(b) is a perspective view thereof with three laser beams.
Figure 3B:
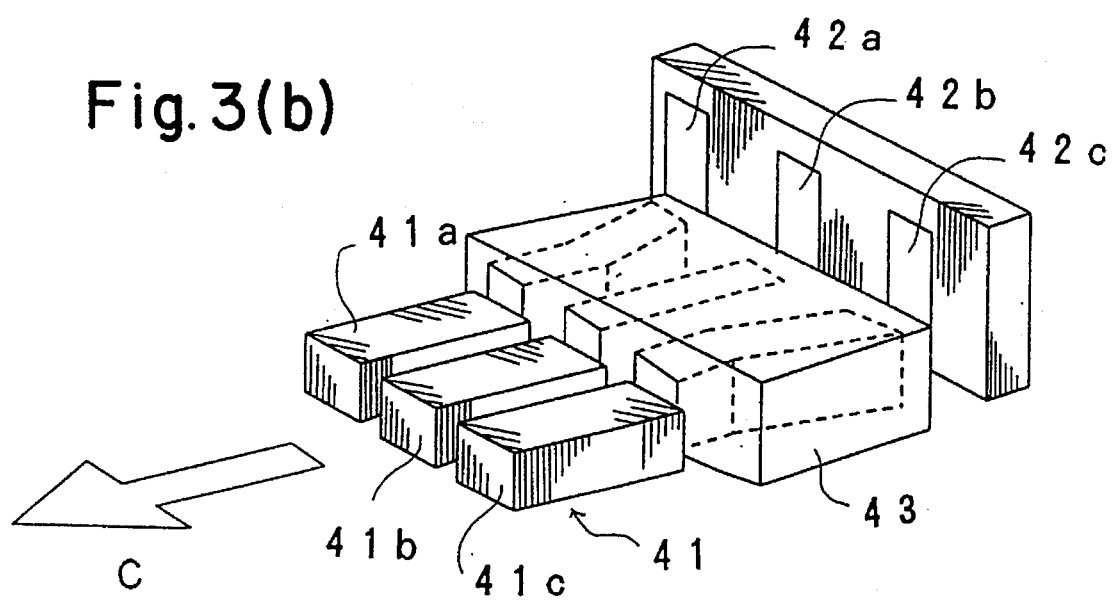

Description will now be given to the second embodiment illustrated in FIG. 2. In this second embodiment, a laser diode array 21 is used instead of the laser diode 11 of the first embodiment. Accordingly, the microlens 14 is replaced by a microlens array 24 and the photo diode 12 is replaced by 3 pieces of photo diodes 22a, 22b and 22c. In other words, as illustrated in FIG. 2, the laser diode array having thereon 3 pieces of laser diodes 21a, 21b and 21c, a beam splitter 23 and the photo diodes 22a through 22c are disposed on a common semiconductor substrate 25 with the positional relation of FIG. 1.

The beam splitter 23 is provided with an slanted surface 23a as the beam splitter 13 in FIG. 1 is. This slanted surface 23a reflects thereby a part of the laser beams emitted from the laser diode array 21 and concurrently transmits therethrough the other part of the laser beams. Over the transmitted light emission surface of the beam splitter 23 is integrally formed the microlens array 24 to converge the beams of the laser light to the respective photo diodes 22a through 22c. Accordingly, the pitches of the respective microlenses of the microlens array 24 are set to be equal to the pitches of the respective laser diodes 21a through 21c.

When the pitches of the laser diodes 21a through 21c are set within a range from 50 [μm] to 100 [μm], the pitches of the respective microlenses of the microlens array 24 can also be set within a range from 50 [μm] to 100 [μm].

In this arrangement, the laser beam emitted from the laser diode 21a enters the photo diode 22a, the laser beam emitted from the laser diode 21b enters the photo diode 22b, and the laser beam emitted from the laser diode 21c enters the photo diode 22c, whereby the powers of the laser beams emitted from the respective laser diodes 21a through 21c are detected respectively. That is, the powers of the laser beams are detected on the front side of the laser diode as is the case with FIG. 1. Here, the microlens array 24 may be manufactured by the ion-exchanging method or the like as is the case with FIG. 1.

Next, the size of each element of the above second embodiment will be examined.

When the distances between the laser diodes 21a through 21c and the beam splitter 23 are set to 2 [mm] respectively and the expansion angles (full angle at half maximum) of the laser beams emitted from the laser diodes 21a through 21c are set to 30° respectively, for example, the diameters of the laser beams entering the beam splitter 23 are approximately 1.1 [mm] respectively, and the size of the beam splitter 23 is at most approximately 2 [mm]×2 [mm]×6 [mm]. When the thickness of the microlens array 24 is set to 0.5 [mm] and the focal length of the microlens array 24 is set to 3 [mm], the photo diodes 22a through 22c can be disposed in a position approximately 0.5 [mm] to 2.5 [mm] behind the beam splitter 23 respectively. As a result, these elements can be housed within a single package (e.g., 9 mmφ).

Even when the distances between the laser diodes 21a through 21c and the beam splitter 23 are shortened to 1.5 [mm] respectively or the expansion angles (full angle at half maximum) of the laser beams emitted from the laser diodes 21a through 21c are narrowed to 20°, the size of the beam splitter 23 can further be reduced, and these elements can be housed within a smaller single package as is the case with FIG. 1.

According to the present invention as described above, the power of the main laser beam for writing/reading is detected instead of the power of the sub beam emitted in a direction opposite to the direction of the main beam. Therefore, there is no possibility that the power of the laser beam to be detected is rendered unstable due to the laser beam returned from the magneto-optic disc, whereby the power of the laser beam can precisely be detected. Furthermore, the laser beam to be detected is focused onto the photo diode by the microlens integrally formed on the surface from which the laser beam transmitted from the beam splitter is emerged. Therefore, the construction of the optical system for monitoring the laser power is so simple that the manufacture thereof is easy.

We claim:

1. An optical pick-up comprising:

a laser source for emitting a laser beam;

a beam splitter for splitting the laser beam by reflecting a part of the laser beam at a first surface and by refracting the other part of the laser beam at the first surface, the refracted part being passed through the beam splitter and emerged from a second surface;

a microlens for focusing the beam which is emerged from the second surface of the beam splitter, the microlens being integrally formed on the second surface;

a photo detector for detecting the beam which is focused by the microlens at a focal point of the microlens and for outputting detection signal responsive to the beam which is focused by the microlens; and a substrate mounted with the laser source, the beam splitter, the microlens and the photo detector.

2. An optical pick-up according to claim 1, wherein said photo detector being provided thereon with an antireflective film.

3. An optical pick-up comprising:

a laser source emitting a laser beam;

splitting means for splitting the laser beam into a first split beam and a second split beam;

a plurality of optical elements for focussing the first split beam onto a magneto-optic disc and focusing a reflected beam onto a photo detector, the reflected beam being reflected from the magneto-optic disc;

focusing means for focusing the second split beam; and detecting means for detecting the second split beam at a focal point of the focusing means.

4. An optical pick-up according to claim 3, wherein said laser source, said splitting means, said focusing means and said detecting means are mounted on a common substrate.

5. An optical pick-up comprising:

a laser diode emitting a laser beam;

splitting means for splitting the laser beam into a first split beam and a second split beam;

a plurality of optical elements for focusing the first split beam onto a magneto-optic disc and focusing a reflected beam onto a photo detector, the reflected beam being reflected from the magneto-optic disc;

focusing means for focusing the second split beam;

detecting means for detecting the second split beam at a focal point of the focusing means to produce a detection signal having a level responsive to the second split beam; and control means for controlling a drive current applied to the laser diode so as to reduce a difference between a target level and the level of the detection signal.

6. An optical pick-up comprising:

a laser source emitting a laser beam;

a beam splitter for splitting the laser beam by reflecting a part of the laser beam at a first surface to send out as a first split beam and by transmitting the other part of the laser beam at the fist surface to receive in as a second split beam, the second split beam being passed through the beam splitter an emerged from a second surface;

a plurality of optical elements for focusing the first split beam onto a magneto-optic disc and for focusing a reflected beam onto a first photo detector, the reflected beam being reflected from the magneto-optic disc;

a microlens for focusing the second split beam onto a second photo detector, the microlens being integrally formed on the second surface, and the second photo detector being positioned at a focal point of the microlens for detecting the second split beam; and a substrate mounted with the laser source, the beam splitter, the microlens and the second photo detector.

7. An optical pick-up comprising:

a laser source for emitting a laser beam;

a splitting means for splitting the laser beam into a first split beam and a second split beam;

a converging means for converging the second split beam;

a photo detector for detecting the second split beam to monitor a power level of the second split beam; and a substrate mounted with the laser source, the splitting means, the converging means and the photo detector.

\* \* \* \* \*